United States Patent
Walsh, III

(10) Patent No.: US 7,350,998 B2
(45) Date of Patent: Apr. 1, 2008

(54) GLASS CLEANING TOOL

(76) Inventor: Raymond J. Walsh, III, P.O. Box 955, Round Lake Beach, IL (US) 60073

( * ) Notice: Subject to any disclaimer, the term of this patent is extended or adjusted under 35 U.S.C. 154(b) by 472 days.

(21) Appl. No.: 11/047,599

(22) Filed: Feb. 2, 2005

(65) Prior Publication Data
US 2005/0180807 A1 Aug. 18, 2005

Related U.S. Application Data
(60) Provisional application No. 60/544,493, filed on Feb. 17, 2004.

(51) Int. Cl.
*B43K 23/02* (2006.01)
*B43K 5/16* (2006.01)
*A46B 11/00* (2006.01)
*B05C 17/00* (2006.01)

(52) U.S. Cl. .................. 401/131; 401/99; 401/191; 401/208

(58) Field of Classification Search ............ 401/23–25, 401/99, 115–117, 191, 197, 125; 15/144.1, 15/209.1, 220.1, 244.1, 244.2, 245
See application file for complete search history.

(56) References Cited

U.S. PATENT DOCUMENTS

| | | | |
|---|---|---|---|
| 255,851 A * | 4/1882 | Gross et al. ............... 401/117 |
| 1,043,414 A * | 11/1912 | Fliegler ..................... 401/24 |
| 1,376,195 A | 4/1921 | Fernandez |
| 2,521,967 A * | 9/1950 | Dean ......................... 401/206 |
| 2,997,732 A | 8/1961 | Gilchrist et al. |
| 3,837,747 A | 9/1974 | Seymore |
| 4,407,213 A | 10/1983 | Evans |
| 4,742,595 A | 5/1988 | Isaacs |
| 4,809,386 A | 3/1989 | Re |
| 4,954,001 A | 9/1990 | Billat |
| 5,328,283 A | 7/1994 | Viens |
| 5,343,586 A | 9/1994 | Voshikian |
| 6,371,129 B1 * | 4/2002 | Le Bras-Brown et al. .. 132/218 |
| 2002/0078519 A1 | 6/2002 | Boothby |

FOREIGN PATENT DOCUMENTS
DE 3834301 4/1990
GB 450879 7/1936

* cited by examiner

*Primary Examiner*—David J. Walczak
(74) *Attorney, Agent, or Firm*—Richard C. Litman

(57) ABSTRACT

The present glass cleaning tool is a small, handheld, easily stored device having a self-contained supply of cleaning fluid stored therein and an applicator head for applying the fluid to a glass surface. The applicator head is stored within the storage handle of the device when the device is not in use. An attachment mechanism extends between the storage handle and the applicator head to secure the head to the handle and to allow the head to be extended from its storage location within the handle to its deployed position across the end of the handle, with the handle and head forming a T-shaped configuration. The device is particularly well-suited for carriage in an interior storage area of a motor vehicle for use in cleaning cigarette smoke film, fingerprint smears, and other contaminants from the interior of the windshield and other glass surfaces in the vehicle.

18 Claims, 8 Drawing Sheets

GLASS CLEANING TOOL

CROSS-REFERENCE TO RELATED APPLICATION

This application claims the benefit of U.S. Provisional Patent Application Ser. No. 60/544,493, filed Feb. 17, 2004.

BACKGROUND OF THE INVENTION

1. Field of the Invention

The present invention relates generally to implements for cleaning various articles, and more specifically to a portable, compact tool adapted particularly for cleaning glass, such as vehicle window interior surfaces and other glass surfaces. The glass cleaning tool has a tubular handle portion and a generally tubular applicator head portion, with the applicator head being stored in the handle when not in use. The applicator extends from the handle to form a T-shaped tool when deployed.

2. Description of the Related Art

Glass surfaces, such as windows, vehicle windshields, etc., require periodic cleaning in order to maintain their optimum transparency. This is particularly true with motor vehicles, where loss of transparency due to a dirty or contaminated surface can pose a safety hazard. The exterior of a vehicle windshield normally receives most of the contamination (insects, road dirt kicked up by the tires of other vehicles, etc.), with other exterior glass surfaces also receiving a certain amount of dirt and contamination. This is such a widely recognized problem that most service stations provide some form of glass cleaning equipment for the use of motorists when they stop for fuel.

However, interior glass surfaces are also subject to the accumulation of various contaminants as well, which can render them difficult to see through. Cigarette smoke will leave a film of translucent material on the interior glass of a vehicle or other interior area (room of a home, etc.), and the plastics used in most newer vehicles will release gaseous materials which condense on other surfaces, such as the interior of the vehicle glass. Small children are well known to have tendencies to smear fingerprints on all kinds of surfaces, including vehicle glass interior surfaces. The net result of these various problems is that the interior glass of a motor vehicle needs cleaning from time to time, as well as the exterior surfaces of the glass.

Yet, no really suitable tool or implement has been developed in the past for such use. The tools provided at most service stations for cleaning the exterior glass, are much too long and bulky to manipulate into the sloped interior corners of a vehicle windshield or rear glass area. The windshield interior is particularly difficult to clean, with the steering wheel and rear view mirror restricting access to the windshield interior surface. Accordingly, most persons who have need to clean the interior glass surfaces of an automobile or other motor vehicle have merely used a spray-on cleaner or saturated cloth to apply a cleaning liquid or solvent, and a clean, dry cloth to remove the applied solvent and contaminants. This is the standard procedure, even at car washes where such work is accomplished on a constant basis. The typical motor vehicle operator has access to such equipment only at his or her home, in any event.

Accordingly, a need will be seen for a very small and compact glass cleaning tool to facilitate the cleaning of glass surfaces, particularly the interior surfaces of the windshield and other glass areas in a motor vehicle, although the present cleaning tool may be used on other glass surfaces as well. A discussion of the related art of which the present inventor is aware, and its differences and distinctions from the present invention, is provided below.

U.S. Pat. No. 1,376,195, issued on Apr. 26, 1921 to Alphonse Fernandez, titled "Window Cleaning Device," describes a handheld device with an applicator head extending across the end of a handle to form a permanent, fixed, T-shaped configuration. The handle is solid, however, and is of a much smaller diameter than the head portion; the head cannot be stored within the handle of the Fernandez device. Moreover, Fernandez provides two separate compartments within the head portion of his device, with one being used for clean water or fluid and the other for the collection of dirty fluid. The head of the device must remain essentially horizontal during use and storage, or the fluid will leak or seep from the compartments. The Fernandez device is, thus, not suited for use across the interior or exterior surfaces of motor vehicle windows and the like, as it must be held with the head in an essentially horizontal orientation.

U.S. Pat. No. 2,997,732, issued on Aug. 29, 1961 to James R. Gilchrist et al., titled "Bug Remover For Windshields And The Like," describes a T-shaped device in which the handle portion serves as a reservoir for a cleaning fluid, which is dispensed through a porous sponge that extends across the head of the device. A relatively coarse bristled brush is also provided on the head. The device requires a separate supply of water into which the head is dipped to dilute the solvent as it flows from the reservoir within the handle. No means is provided for removing the head portion from the handle portion, and/or storing the head portion within the handle portion.

U.S. Pat. No. 3,837,747, issued on Sep. 24, 1974 to Ulysee Seymore, titled "Washer/Squeegee," describes a device which more closely resembles the scrubbing and cleaning device of the Gilchrist et al. '732 U.S. patent discussed immediately above, than it does the present invention. The Seymore device includes a hollow tubular handle, which serves as a reservoir for a cleaning fluid or liquid, with a fluid passage communicating with a porous sponge, which extends along the head of the device. A manually operable valve at the neck of the device allows the user to control fluid flow from the reservoir handle to the sponge applicator along the head. The neck of the head portion is threaded onto the reservoir handle portion, and cannot retract into the handle portion for storage.

U.S. Pat. No. 4,407,213, issued on Oct. 4, 1983 to Peter R. Evans, titled "Cleaning Implement For Boats," describes a device having a narrow, solid, elongate handle, which attaches adjustably and removably to a hollow head extending thereacross to form a generally T-shaped configuration. The head is intended to remain sealed during use, as it provides a buoyancy chamber to provide support for the device while cleaning the bottom of a boat while it is in the water. While Evans provides for the storage of the cleaning sponges within the hollow head when the device is not in use, it is impossible to store the head portion within the handle, as the handle has a much smaller diameter and is a solid component.

U.S. Pat. No. 4,742,595, issued on May 10, 1988 to John E. Isaacs, titled "Window Cleaning Device," describes various embodiments having one or more squeegees and/or a scrubber disposed along the edges of the head component, with a handle pivotally secured to the midpoint of the handle. The device forms a T-configuration when the head is deployed for use, with the handle and head folding parallel to one another for storage of the device. While the handle is hollow, it does not provide sufficient internal space for the storage of the head of the device therein, nor can the head of the device be displaced to fit within the handle. Also, Isaacs does not provide any form of cleaning fluid container for his device, nor means to prevent dirty fluid remaining on the cleaning elements from contacting another object against which his device is placed.

U.S. Pat. No. 4,809,386, issued on Mar. 7, 1989 to Uberto Re, titled "Combined Manual Implement For Window Snow Removal, Ice Scraping, Washing And Drying, For Vehicles In General," describes a T-shaped device having clamps for gripping a squeegee, brush, and/or sponge along the length of the head component thereof. A T-shaped ice scraper has a handle, which may be inserted within the handle stem of the device, with the head of the ice scraper nesting within the channel of the T-shaped head of the main component. Neither head of the ice scraper nor primary component may be turned to retract within the handle of the primary component, and no cleaning fluid reservoir is provided by Re for his combination window cleaning device.

U.S. Pat. No. 4,954,001, issued on Sep. 4, 1990 to Alain E. Billat, titled "Multi-Purpose Cleaning Device, In Particular For Vehicle Windows And The Like," describes a relatively small handheld device having a generally T-shaped configuration. The head is immovably affixed to the handle portion; however, the head and handle are separable along a generally symmetrical parting line to form two T-shaped components. A fluid reservoir is placed within the hollow handle portion, with a trigger mechanism operating to expel a cleaning fluid from the reservoir. The head of the device cannot be retracted or stored within the handle, as can the head of the present glass cleaning tool. Billat does provide for covering or containing a wet and/or soiled cleaning element, but does so by pivoting a cover thereover, with the cover remaining pivotally attached and parallel to the head of the device.

U.S. Pat. No. 5,328,283, issued on Jul. 12, 1994 to Jacques Viens, titled "Multi-Function Glass Cleaning Apparatus," describes a device having a relatively bulky head with a long, narrow detachable handle. The device has a hollow interior for the storage of a cleaning fluid therein, and also has a generally L-shaped side elevation. The distal end of one arm of the L includes a squeegee, while the juncture of the two arms has a sponge or similar element therealong. The handle attaches removably to the distal portion of the arm opposite the squeegee. The device cannot fold with the head stored in the handle container.

U.S. Pat. No. 5,343,586, issued on Sep. 6, 1994 to Peter S. Vosbikian, titled "Window Cleaning Device," describes a generally T-shaped component having a pair of mirror image crossmembers, which clamp a squeegee along one edge thereof and a sponge along the opposite edge thereof. The two clamping components form the crossmember or head of a T-shaped assembly, with a socket for a handle forming the stem of the T. The handle receptacle and head components are permanently secured together, and cannot move, pivot, or retract relative to one another. Accordingly, no means is provided for storing the head within the handle portion of the Vosbikian cleaning device, nor does Vosbikian provide any means for holding and/or dispensing a cleaning fluid therefrom or preventing the cleaning elements from coming into contact with another object.

U.S. Patent Publication No. 2002/78,519, published on Jun. 27, 2002, titled "Low Profile Combination Scrubbing And Squeegee Device," describes another generally T-shaped cleaning implement having a head component comprising the crossmember of the assembly with a sponge and squeegee thereon, and a narrow, elongate, articulated handle forming the stem of the T configuration. The articulated handle permits the device to be used to clean the glass in a narrow, confined space, such as the gap between the rear window and camper shell on a pickup camper vehicle. Boothby does not provide any means of folding the head portion of his device to store within the handle, nor does he provide any means of containing a fluid or preventing contact of the soiled cleaning elements with another surface.

British Patent No. 450,879, published on Jul. 27, 1936, titled "Improvements In And Relating To Cleaning Brushes For Underwater Use," describes a device having a hollow head to provide buoyancy for the device. As such, the Haward cleaning brush more closely resembles the cleaning tool of the Evans '213 U.S. Patent, discussed further above, than it does the present invention. Haward does not provide any means of dispensing a cleaning fluid, containing soiled fluid, or storing the cleaning elements within a hollow handle portion to prevent their contact with other objects.

Finally, German Patent No. 3,834,301 published on Apr. 12, 1990, titled "Cleaning Implement," describes (according to the drawings and English abstract) an extrusion having a series of slots therein. One of the slots captures the head of the handle therein, forming a generally T-shaped configuration for the assembly. The other two slots capture squeegee and sponge elements therein, with a brush being secured to an outer surface of the extrusion. No storage of the head within the handle for convenience and to prevent contact of the soiled cleaning elements with other objects, dispensing of fluid, or containing soiled fluid are apparent in the '301 German Patent Publication.

None of the above inventions and patents, taken either singly or in combination, is seen to describe the instant invention as claimed. Thus, a glass cleaning tool solving the aforementioned problems is desired.

SUMMARY OF THE INVENTION

The glass cleaning tool is a small, lightweight, compact device, which may be easily stored without requiring excessive storage space. The cleaning tool may be used to clean virtually any glass or other similarly smooth surface, but is particularly well adapted for use in cleaning the interior surfaces of automobile windshields and other vehicle glass panels. The compact size of the present tool, even when deployed for use, renders it easily maneuverable about the inner surface of a vehicle windshield and around obstructions, such as the steering wheel and interior rear view mirror. When folded for storage, the cleaning tool requires even less space, as the cleaning element or head of the device stores within the hollow head storage handle portion. A cap is provided to seal the device in order to prevent leakage of cleaning fluids or solvents therefrom when stored.

The applicator head portion of the present cleaning tool includes a T-section track extending from one end to a point midway along the length of the device, on the side opposite the cleaning element. A hemispherical cover having a track extension is secured to the slot end of the applicator head. A slide is disposed within the applicator head storage handle, with a T-shaped neck extending from the slide. The distal end of the neck is captured within the track of the applicator head. A reservoir or supply of cleaning fluid or the like may be contained within the applicator head, for dispensing onto or into the applicator.

To deploy the device, the applicator head is pulled from its storage handle, with the slide traveling up within the storage handle. When the applicator head has been completely extended from its storage handle, it is axially rotated 90° by means of the neck of the slide riding in the curved track in the hemispherical end cover of the applicator, and the applicator head is slid along the neck of the slide until the neck is positioned at the end of the track, i.e., the midpoint of the applicator handle. This places the assembly in a T-shaped configuration, with the applicator head oriented for applying a cleaning fluid contained therein to a glass surface. A squeegee or other wiping means may be provided along the applicator head as well, for cleaning the residue from the glass after the cleaning solution has been applied.

Retraction and storage of the applicator head is accomplished by reversing the process described above for extension of the applicator. A cleaning or wiping element may be provided within the applicator head storage handle to clean foreign matter from the cleaning element and/or squeegee or other elements of the applicator as it is reinserted therein. A captive cap is then placed over the open end of the storage handle to seal the applicator head therein for storage of the device. The device in its storage configuration, with the applicator head stored within its storage handle, takes up no more room than the exterior dimensions of the handle portion of the device.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a very small and compact glass cleaning tool, which is easily stored within a small storage compartment when in its storage configuration. The glass cleaning tool may be used to clean virtually any smooth surface, but is particularly well suited for carriage within the glove compartment or similar storage area of a motor vehicle for use in cleaning smoke film, plastic volatiles that have collected on the glass surface, fingerprints and smears, and other residue from the interior surfaces of the vehicle windshield and other glass areas.

Figure 1:
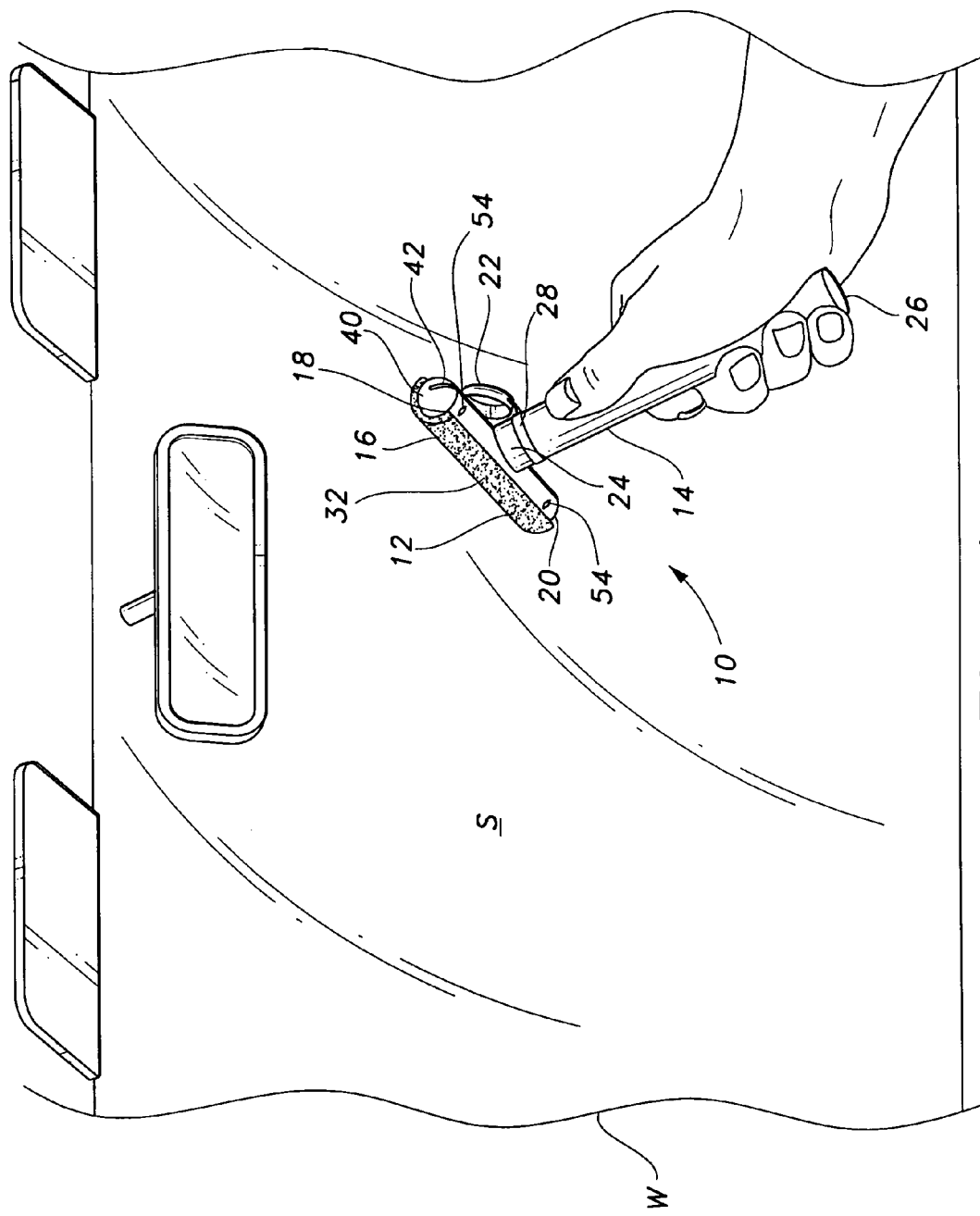
FIG. 1 is an environmental, perspective view of the glass cleaning tool of the present invention, showing its use.
Figure 8:
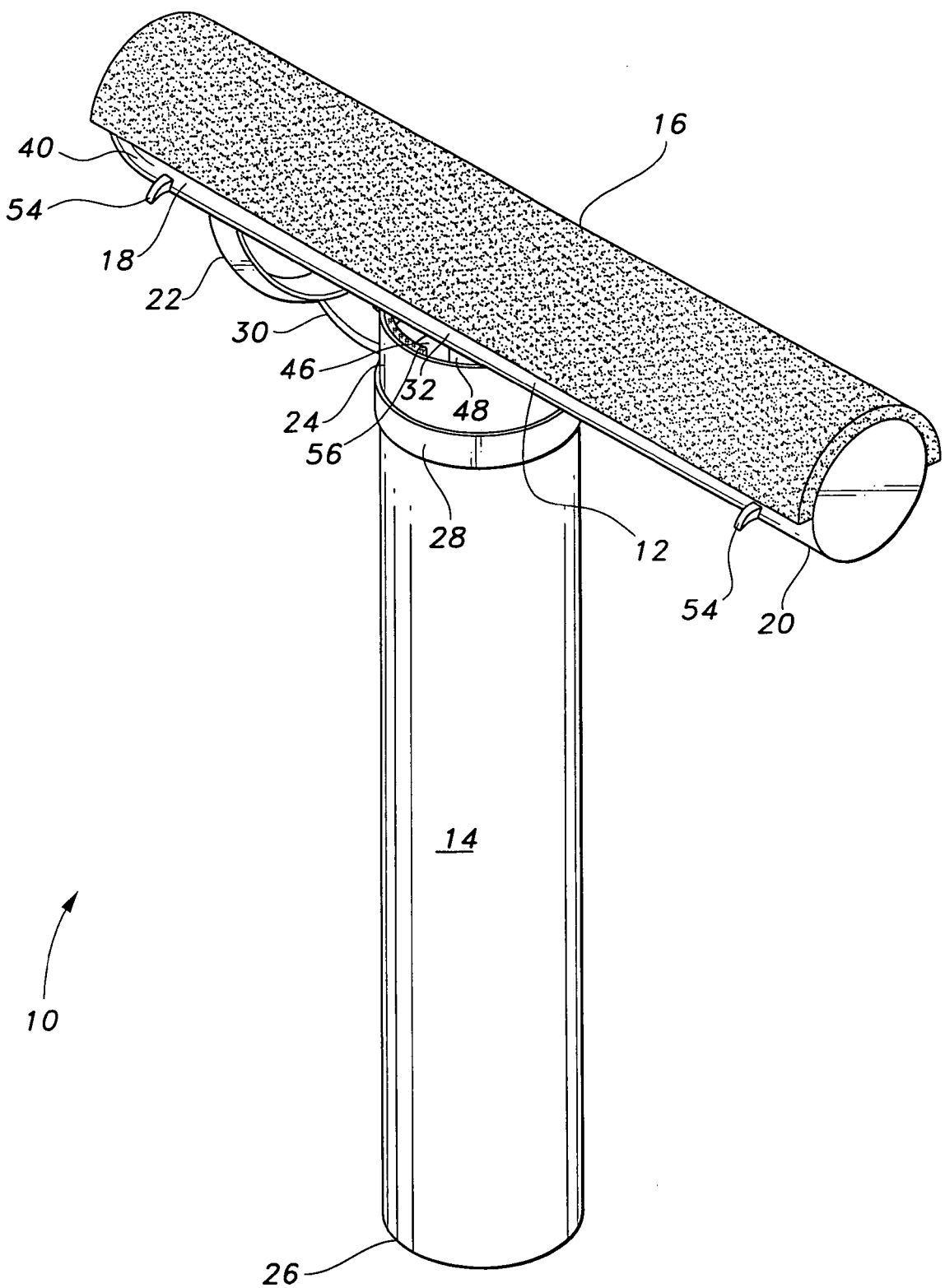
FIG. 8 is a perspective view showing the final step in the deployment of the applicator head, wherein the head is slid along the slide neck to the midpoint of the applicator head.

FIG. 1 of the drawings provides an environmental illustration of the present glass cleaning tool 10 being used to clean the interior surface S of an automobile windshield W. The device 10 includes a hollow, elongate applicator head 12, which is permanently secured to a hollow, elongate applicator head storage handle 14. The applicator head 12 includes a glass cleaning applicator element 16 (e.g. porous sponge material, etc.), which extends substantially from the first end 18 to the opposite second end 20 of the applicator head 12. When the applicator head 12 is deployed for use, the head 12 and handle portion 14 form a generally T-shaped configuration, generally as shown in FIGS. 1 and 8 of the drawings. However, the applicator head 12 stores within the hollow storage handle 14 when the device 10 is in its storage configuration, thereby providing an extremely compact cleaning tool.

Figure 2:
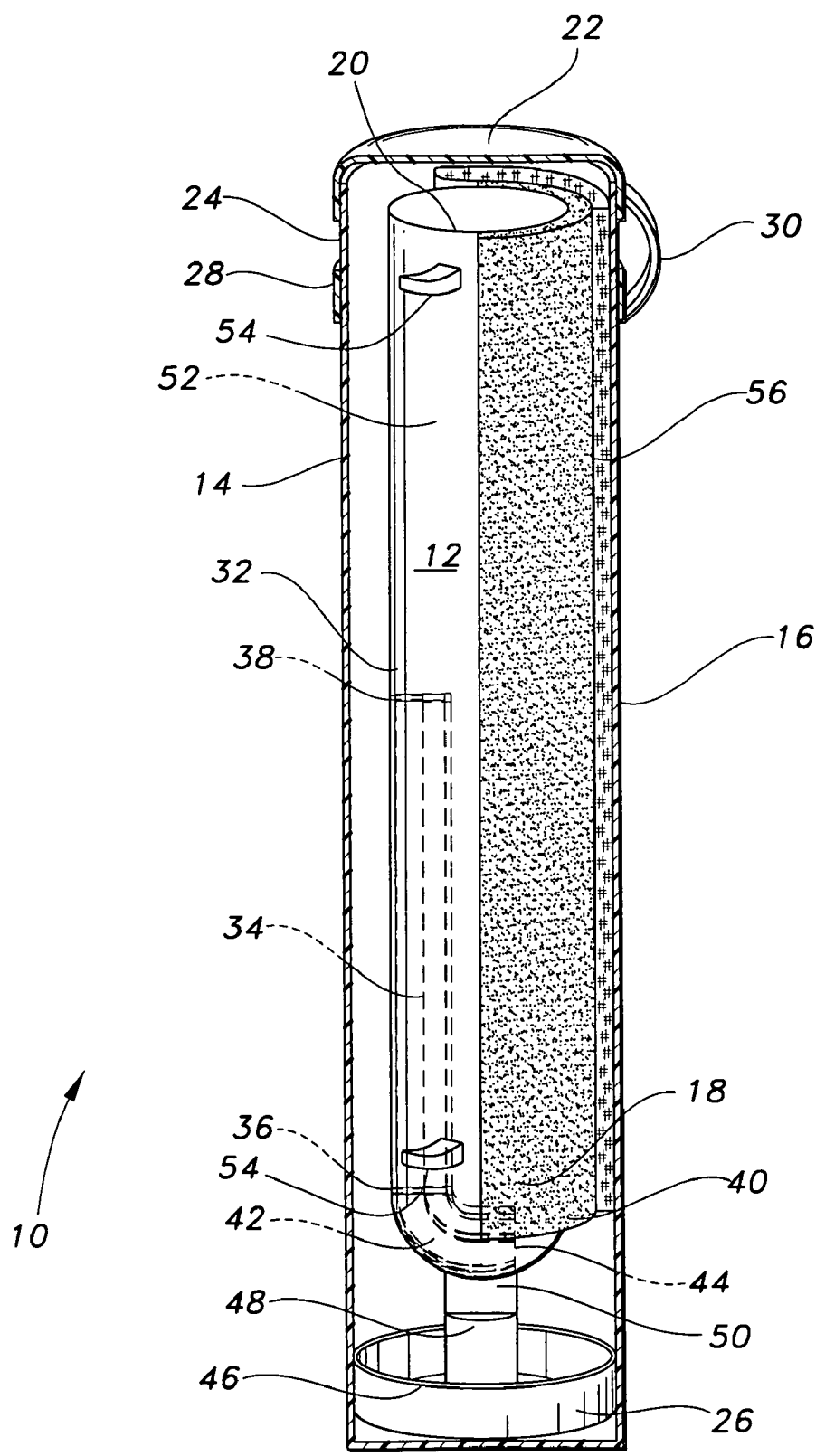
FIG. 2 is a perspective view of the present tool in its storage configuration, with the outer storage handle shown in section to show the applicator head stored therein.

FIG. 2 provides an illustration of the device 10 in its storage configuration, with the applicator head 12 stored within the outer shell defining the applicator head storage handle 14. A cap 22 is captured or secured to the otherwise open applicator head attachment end 24 of the storage handle 14, opposite a permanently closed and sealed end 26, e.g., by a tether 30 connecting the cap 22 to the retainer loop 28. The tether 30 is attached to the storage handle 14 by a retainer loop 28 encircling the attachment end 24, so that the tether 30 can be rotated around the attachment end 24 of the storage handle, as needed. The cap 22 and applicator head attachment end 24 of the storage handle 14 may be compatibly threaded, or the cap 22 may resiliently snap into place (in which case the tether 30 may comprise a living hinge) over the applicator head attachment end 24 of the storage handle 14 to seal any cleaning fluids and/or dirt or debris removed from the glass within the outer storage handle container 14 when the device 10 is in its stored configuration.

Figure 3:
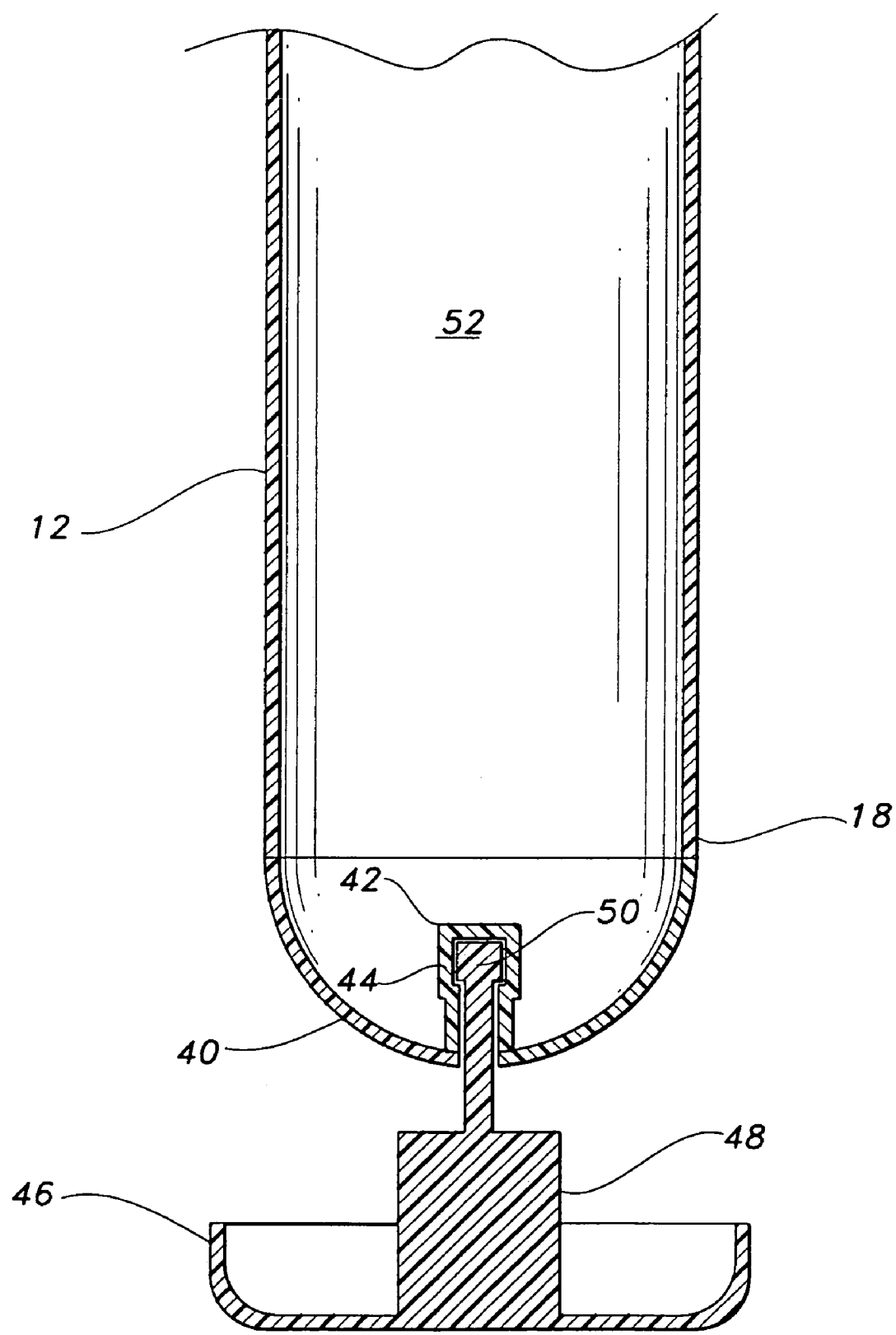
FIG. 3 is a detailed partial elevation view in section of the slide and its extended neck engaging the track of the hemispherical end cover of the applicator head.

The applicator head 12 remains permanently attached to the storage handle 14 by means of a slide and track mechanism which allows the applicator head 12 to extend from its stored position within the storage handle 14, outward to form a final T-configuration with the storage handle 14, wherein the applicator head attachment end 24 of the handle 14 is connected to a medial location 32 along the applicator head 12. FIGS. 2 and 3 of the drawings provide the best illustrations of this slide and track mechanism. The applicator head 12 includes a T-section track 34, having a relatively narrow stem portion, which communicates with the exterior of the applicator head 12, and a wider cross portion within the applicator head 12 and normal to the stem of the T.

The track 34 extends from a first end 36 at the first end 18 of the applicator head 12, along the head 12 to its second end 38 at the medial point or area 32 of the head 12. A first end cover 40 is permanently affixed to the first end 18 of the applicator head 12. The cover 40 may have a hemispherical configuration, as shown in the drawings, or some other configuration as desired. A T-section track extension 42 communicates with and continues from the first end 36 of the track 34 to an end point 44 half way across or around the first end cover 40. FIG. 3 clearly shows a cross sectional view of the end 44 of the track extension 42, with this track extension 42 cross section being essentially identical to the cross section of the primary track 34.

The storage handle 14 includes an applicator head deployment slide 46 therein. The slide 46 may be cylindrically shaped, somewhat like a piston, or may have some other configuration as desired. The slide 46 is free to slide upwardly and downwardly within the hollow interior of the storage handle 14. Conventional stop means (not shown) may be provided at the open end 24 of the storage handle 14, to prevent the slide 46 from departing from its captured location within the interior of the storage handle 14. The slide 46 has a concentric extension 48 with a T-shaped neck portion 50 extending therefrom. The wider crossmember of the T-shaped neck is captured within the wider portion of the T-shaped track 34 and track extension 42, thereby permanently securing the applicator head 12 to the slide 46, which, in turn, is permanently captured within the hollow interior of the applicator head storage handle 14.

Figure 4:
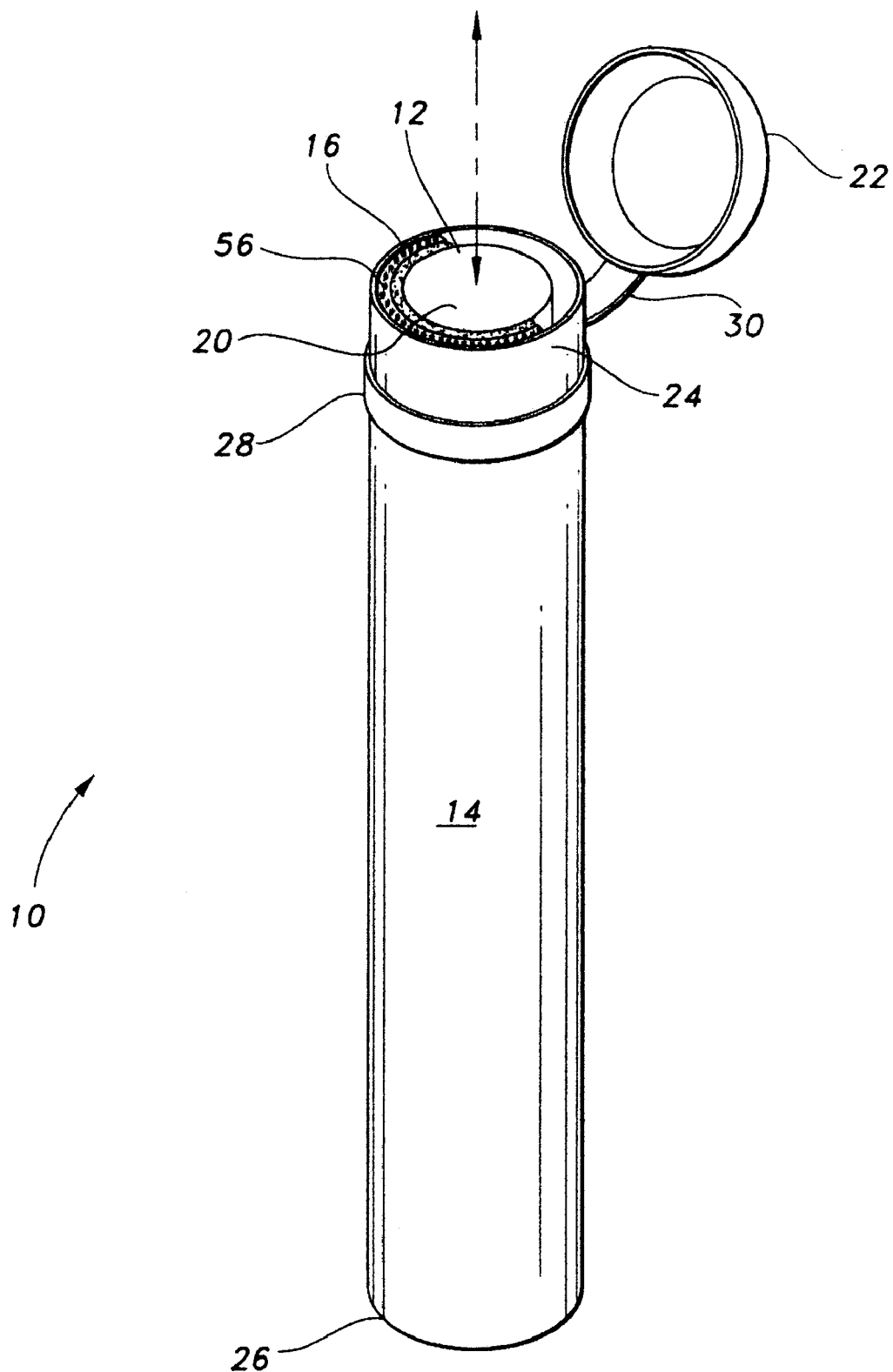
FIG. 4 is a perspective view of the device in its storage configuration, showing the first deployment step wherein the captive cap opened to access the applicator head stored therein.

FIGS. 4 through 8 illustrate the deployment of the applicator head 12 from its storage handle 14 for use. The storage of the applicator head 12 within its storage or container handle 14, results in a very compact device which requires very little room for storage in an automobile glove compartment or other small storage area. In FIG. 4, the cap 22 has been opened to access the applicator head 12 within its storage handle 14; the closed second end 20 of the applicator head 12 is visible in the open end 24 of the storage handle 14.

Figure 5:
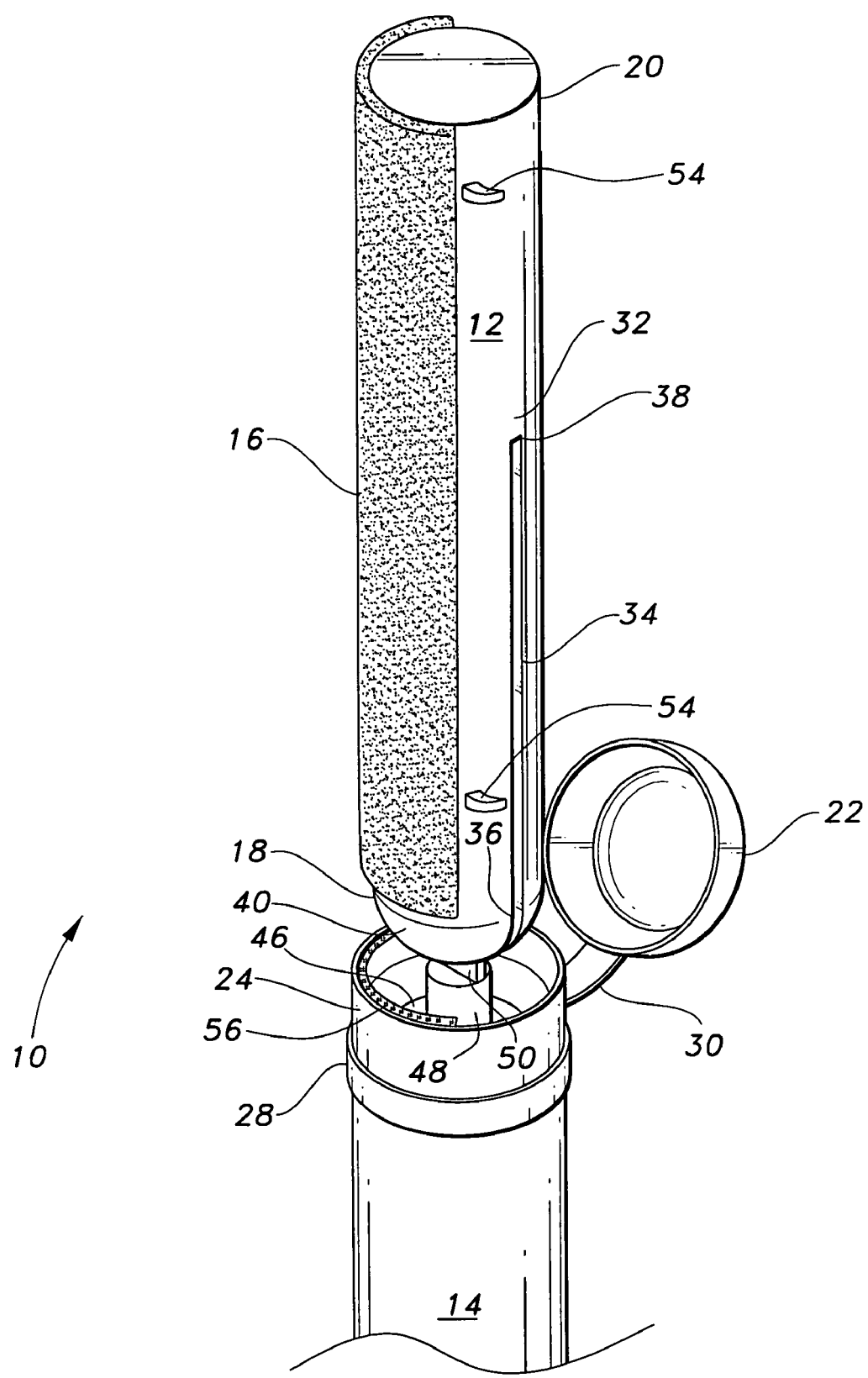
FIG. 5 is a perspective view showing the second step in the deployment of the applicator head, with the head completely extended from its storage handle.
Figure 6:
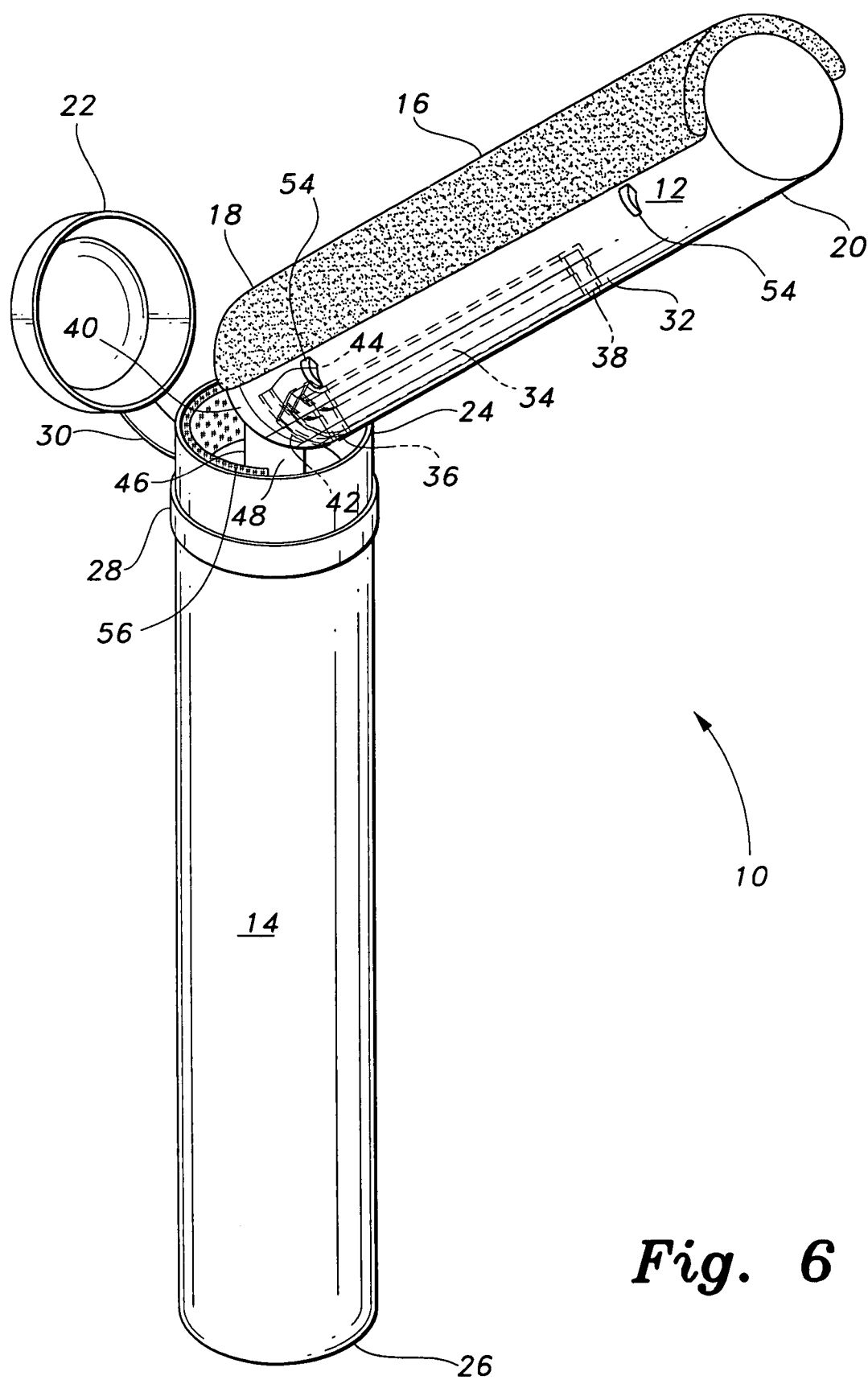
FIG. 6 is a perspective view showing the third step in the deployment of the applicator head, wherein the head is rotated about the neck engagement with the hemispherical cap.
Figure 7:
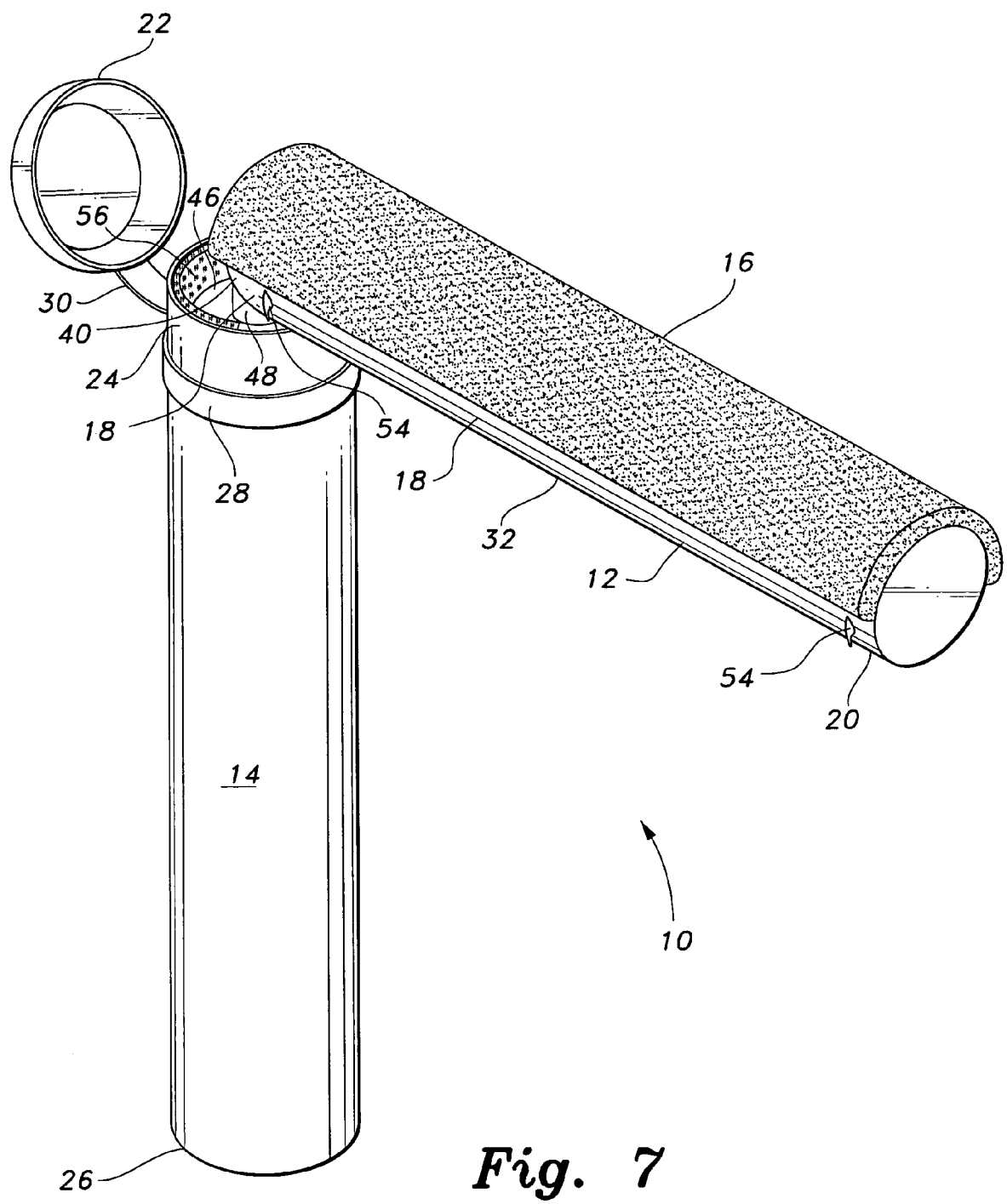
FIG. 7 is a perspective view showing the fourth step in applicator head deployment, with the head oriented 90° to the applicator head storage handle.

Once the cap 22 has been opened, the applicator head 12 may be withdrawn from the interior of the storage handle 14, generally as shown in FIG. 5. The track-engaging neck 50 is captured within the track extension 42 of the end cover 40, with the applicator head deployment slide 46 sliding from its applicator head storage position within the closed end 26 of the handle 14, to its applicator head deployed position within the opposite open end 24 of the storage handle 14.

Once the applicator head 12 has been completely extended from its storage handle 14, the head 12 is pivoted 90° to an orientation normal to the storage handle 14. This is accomplished by means of the neck 50, which extends from the slide 46, traveling along the track extension 42 of the end cover 40, which is permanently attached to the first end 18 of the applicator head 12. The applicator head 12 has been turned or pivoted approximately halfway through this step in FIG. 6, with the completion of this step being shown in FIG. 7.

FIG. 8 illustrates the final step in the deployment of the applicator head 12 from its storage handle 14, with the head 12 shown positioned across the open end 24 of the handle 14 to form a T-configuration for the two components 12 and 14. This is accomplished by continuing to slide the neck 50, which extends from the applicator head deployment slide 46, along the track 34 in the side of the applicator head 12, until the neck 50 reaches the second end 38 of the track 34 at the medial portion 32 of the applicator head 12. The glass cleaning tool 10 is then ready for use.

At this point, the cleaning element 16 may be drawn across the surface S of the windshield W or other glass, generally as shown in FIG. 1 of the drawings. The cleaning element 16 is dampened with a cleaning fluid contained within the hollow interior of the applicator head 12, which acts as a reservoir 52 (indicated in FIGS. 2 and 3) for a supply of the cleaning fluid. The reservoir 52 may communicate with the cleaning element 16 in a conventional manner, e.g., by means of a series of small passages extending through the wall of the applicator head 12 to the cleaning element 16. The cleaning fluid, along with the mechanical scrubbing action produced by drawing the cleaning element 16 across the glass surface S, loosens and removes any film, grime, and other obstructions) to vision that have coated the glass surface S. A squeegee (not shown) may be provided along one side of the applicator head 12, allowing the device 10 to be turned to apply the squeegee to the glass surface S to remove the fluid previously applied by the cleaning element 16. Alternatively, a series of small retaining hooks or catches 54 may be provided along the exterior of the applicator head 12, for the removable attachment of a wiper sheet (e.g., cloth or disposable paper) thereto.

Once the windshield W or other surface has been cleaned, the applicator head 12 may be returned to its storage configuration within its storage handle 14 by reversing the steps illustrated in FIGS. 4 through 8 and discussed further above. A cleaning or wiper pad 56 for removing accumulated dirt and grime from the cleaning element 16 may be provided within the storage handle 14, with such dirt and grime being automatically removed from the cleaning element 16 as the element 16 is drawn across the dirt removal device 56 when the applicator head 12 is reinserted into its storage handle 14. The edge of the slide 46 bears against the wiper pad 56 when the applicator head 12 is subsequently drawn from its storage position within the handle 14 for its next use to scrape dirt and contaminants from the wiper pad 56 and capture them within the concave end of the slide 46. Once the applicator head 12 has been completely returned to its storage location within the storage handle 14, the cap 22 may be secured over the otherwise open end 24 of the storage handle 14 and the device put away for future use.

In conclusion, the glass cleaning tool provides a much needed accessory for those who have need to clean a glass surface of relatively limited area periodically. The cleaning tool is quite compact when in its storage configuration, enabling it to be stored easily in an automobile glove box or other small storage area as desired. The glass cleaning tool is relatively economical to manufacture, depending upon the materials used, and may be purchased inexpensively by persons in need of such a device. A disposable version of the device may be made of relatively inexpensive materials with a limited supply of cleaning fluid, and provided as a promotional gift to consumers purchasing other articles (gasoline, etc.), if so desired. Accordingly, the glass cleaning tool will prove to be quite popular with the vast majority of the motoring public.

It is to be understood that the present invention is not limited to the embodiment described above, but encompasses any and all embodiments within the scope of the following claims.

I claim:

1. A glass cleaning tool, comprising:
   a hollow, elongate applicator head storage handle; and
   an elongate applicator head permanently attached to and selectively positionable relative to said storage handle, selectively stored in said handle and deployed therefrom, wherein said applicator head has a first end, a second end, and a medial area therebetween, the tool further comprising;
   a first end cover permanently affixed to the first end of said applicator head;
   a T-section track extending from the medial area to the first end of said applicator head;
   a T-section track extension extending substantially half way across the first end cover, communicating with the track of the applicator head;
   an applicator head deployment slide disposed within said storage handle; and
   a T-shaped neck extending from said applicator head deployment slide, slidingly captured within said track and said track extension and securing said applicator head to said storage handle for selective storage of said applicator head within said storage handle and deployment of said applicator head from said storage handle as desired.

2. The glass cleaning tool according to claim 1, wherein said applicator head has a first end, a second end, and a medial area therebetween, the tool further comprising a glass cleaning applicator element disposed between the first end and the second end of said applicator head.

3. The glass cleaning tool according to claim 2, further including a glass cleaning fluid reservoir disposed within said applicator head, and communicating with said glass cleaning applicator element.

4. The glass cleaning tool according to claim 1, wherein said applicator head storage handle has an open applicator head attachment end and a permanently sealed end opposite the applicator head attachment end.

5. The glass cleaning tool according to claim 4, further including a selectively opening cap secured to the applicator head attachment end of said storage handle.

6. The glass cleaning tool according to claim 1, further including an applicator element cleaning pad disposed within said storage handle.

7. The glass cleaning tool according to claim 1, further including a plurality of wiper sheet retaining catches disposed upon said applicator head.

8. A glass cleaning tool, comprising:
an elongate applicator head having a first end, a second end opposite said first end, and a medial area therebetween;
a glass cleaning applicator element extending substantially from the first end to the second end of said applicator head;
a glass cleaning fluid reservoir disposed within said applicator head, and communicating with said applicator element;
an elongate applicator head storage handle selectively extending from the medial area of said applicator head, the handle having a hollow applicator head storage compartment therein;
a first end cover permanently affixed to the first end of said applicator head;
a T-section track extending from the medial area to the first end of said applicator head;
a T-section track extension extending substantially half way across the first end cover, communicating with the track of the applicator head;
an applicator head deployment slide disposed within said storage handle; and
a T-shaped neck extending from said applicator head deployment slide, slidingly captured within said track and said track extension and securing said applicator head to said storage handle for selective storage of said applicator head within said storage handle and deployment of said applicator head from said storage handle as desired.

9. The glass cleaning tool according to claim 8, wherein said applicator head storage handle has an open applicator head attachment end and a permanently sealed end opposite said applicator head attachment end.

10. The glass cleaning tool according to claim 9, further including a selectively opening cap secured to the applicator head attachment end of said storage handle.

11. The glass cleaning tool according to claim 8, further including an applicator element cleaning pad disposed within said storage handle.

12. The glass cleaning tool according to claim 8, further including a plurality of wiper sheet retaining catches disposed upon said applicator head.

13. A glass cleaning tool, comprising:
an elongate applicator head having a first end, a second end opposite the first end, and a medial area therebetween;
a rounded first end cover permanently affixed to the first end of said applicator head;
a T-section track extending from the medial area to the first end of said applicator head;
a T-section track extension extending substantially half way about said first end cover, and communicating with said track of said applicator head;
an elongate, hollow applicator head storage handle having an open applicator head attachment end and a closed end opposite the applicator head attachment end;
an applicator head deployment slide disposed within said applicator head storage handle; and
a T-shaped neck extending from said slide, slidingly captured within said track and said track extension and securing said applicator head to said storage handle for selective storage of said applicator head within said storage handle and deployment of said applicator head from said storage handle as desired.

14. The glass cleaning tool according to claim 13, further including a glass cleaning applicator element disposed between the first and the second end of said applicator head.

15. The glass cleaning tool according to claim 14, further including a glass cleaning fluid reservoir disposed within said applicator head, and communicating with said glass cleaning applicator element.

16. The glass cleaning tool according to claim 13, further including a selectively opening cap secured to the applicator head attachment end of said storage handle.

17. The glass cleaning tool according to claim 13, further including an applicator element cleaning pad disposed within said storage handle.

18. The glass cleaning tool according to claim 13, further including a plurality of wiper sheet retaining catches disposed upon said applicator head.

* * * * *